(No Model.) 7 Sheets—Sheet 5.
C. E. LIPE.
BROOM SEWING MACHINE.
No. 402,337. Patented Apr. 30, 1889.
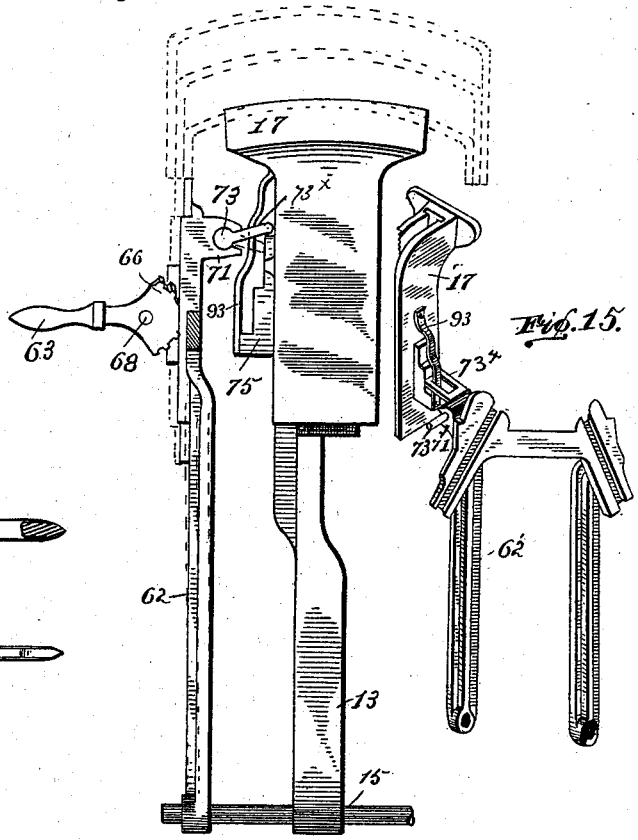
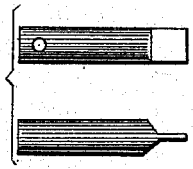
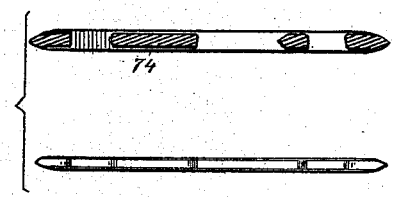
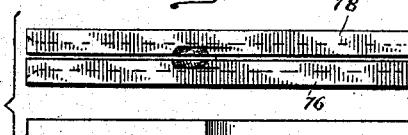
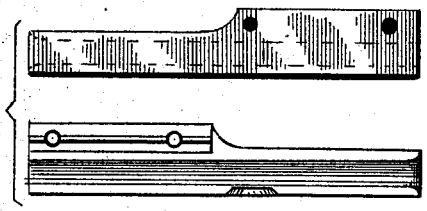
Witnesses:
A. A. Schenck
W. H. Thomas
Inventor:
Chas. E. Lipe

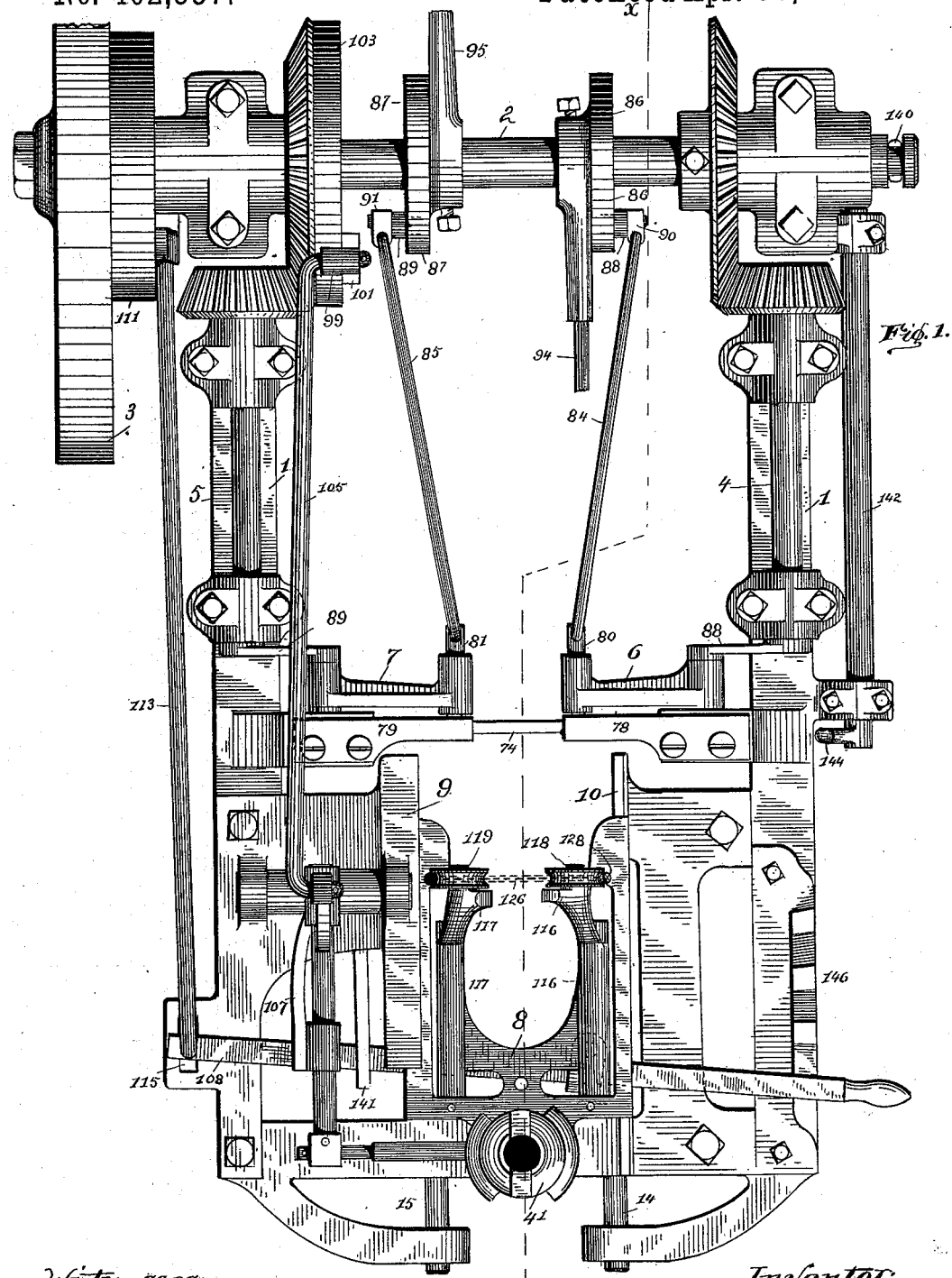

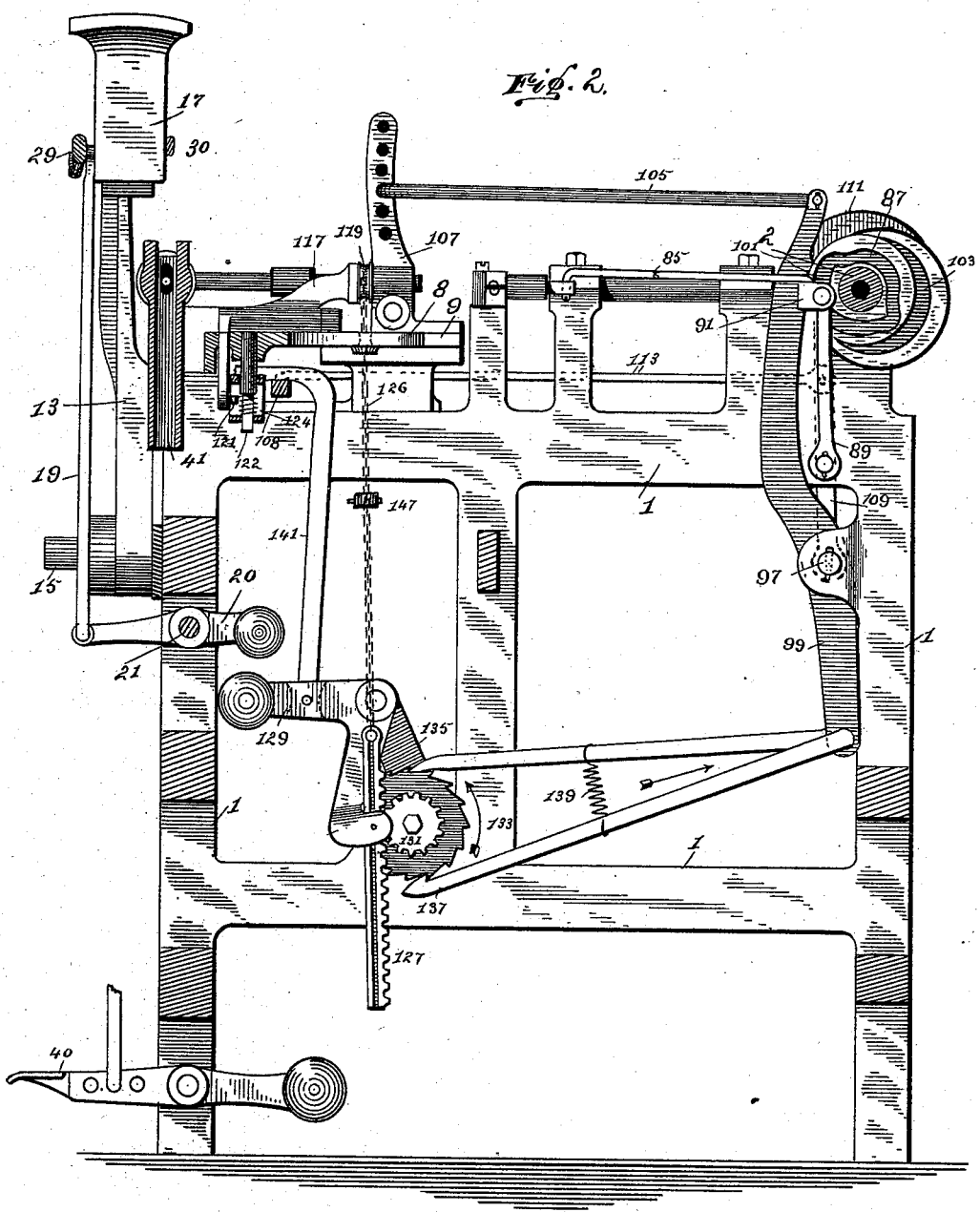

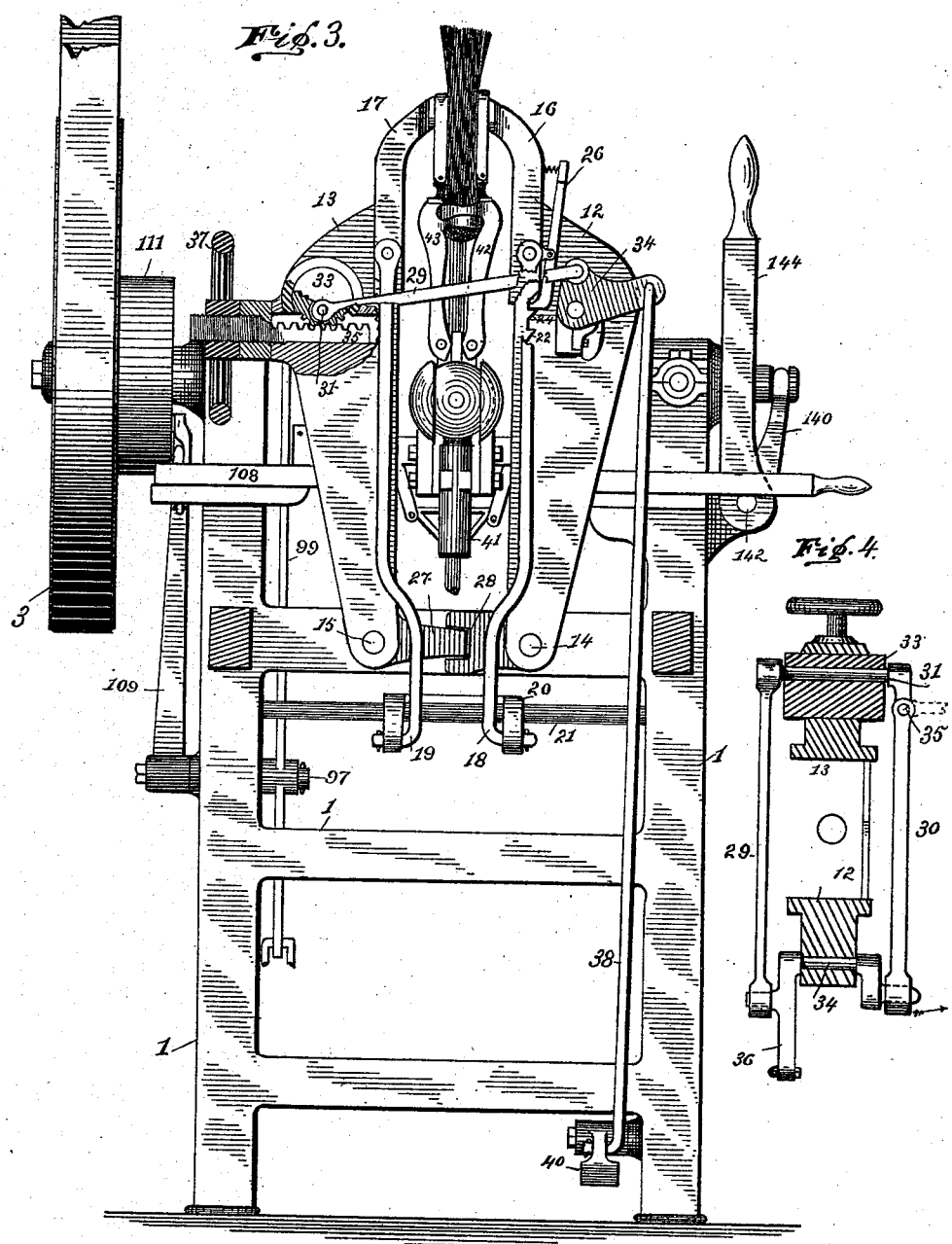

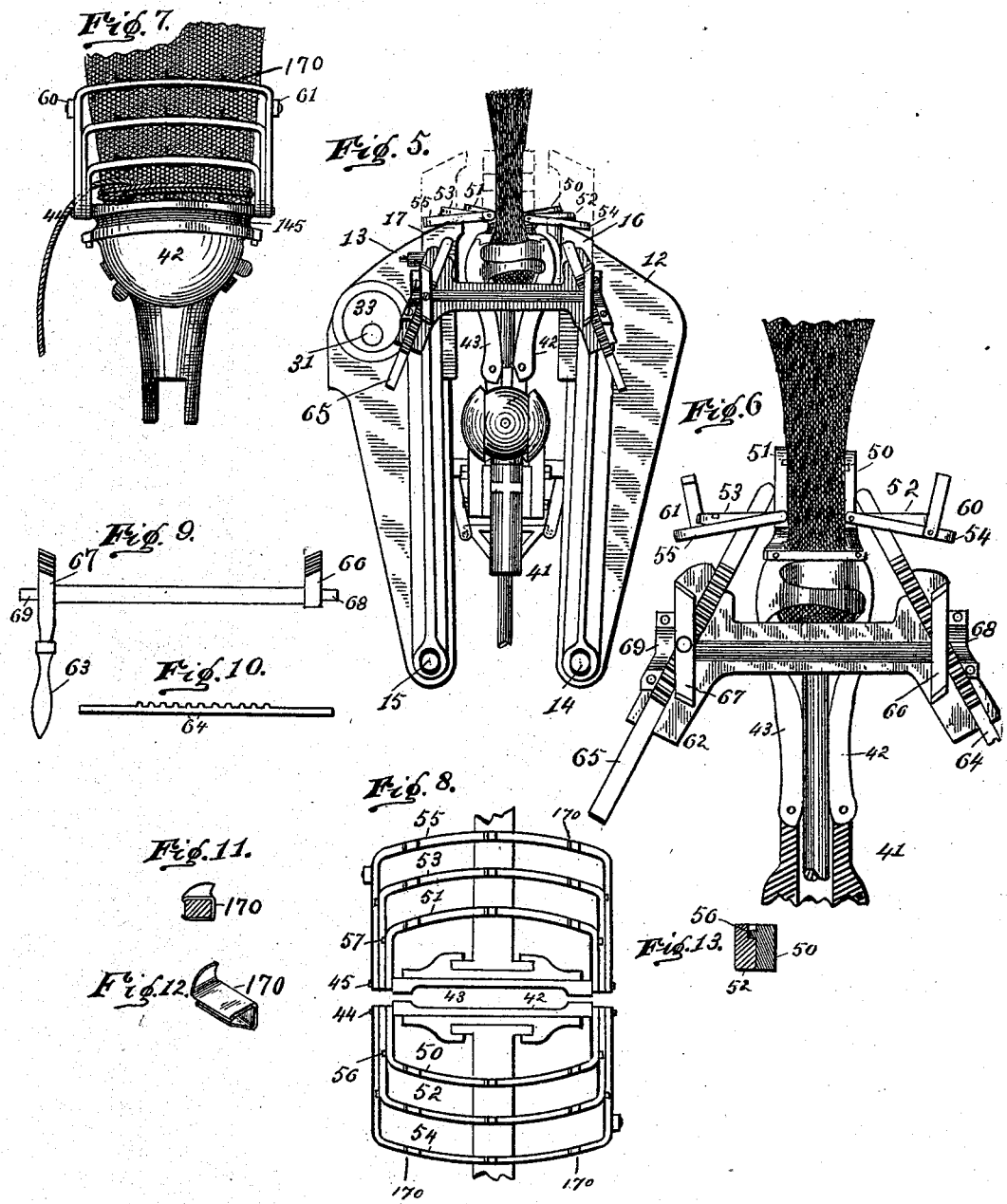

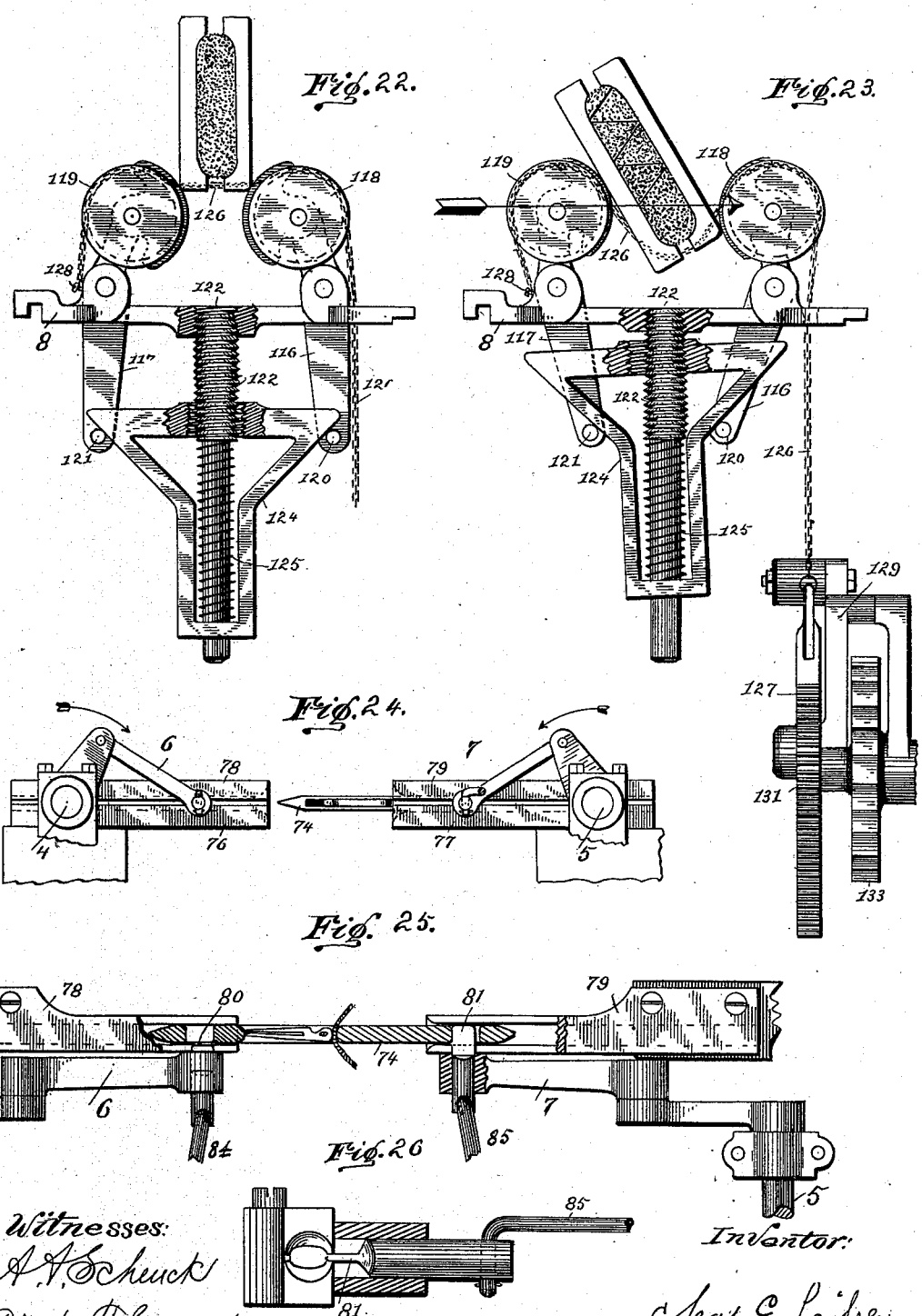

(No Model.) 7 Sheets—Sheet 7.
C. E. LIPE.
BROOM SEWING MACHINE.
No. 402,337. Patented Apr. 30, 1889.
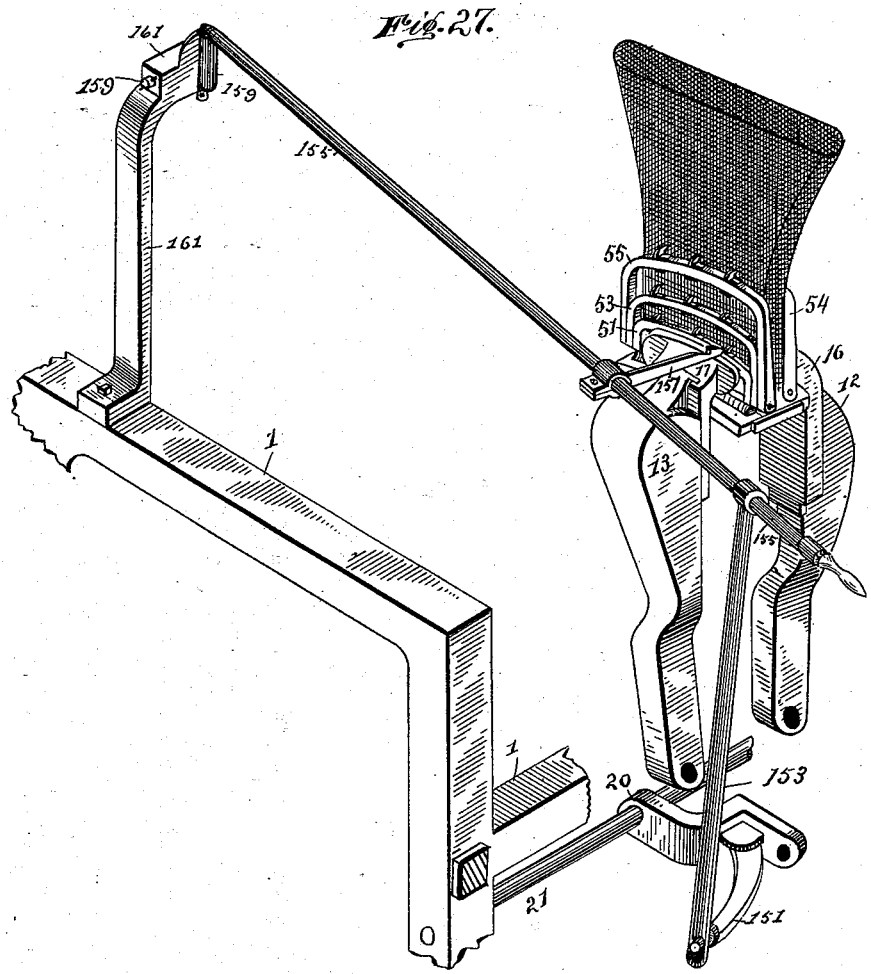
Witnesses:
A. T. Schunck
W. H. Thomas
Inventor:
Chas. E. Lipe

UNITED STATES PATENT OFFICE.

CHARLES E. LIPE, OF SYRACUSE, NEW YORK, ASSIGNOR TO THE HAND STITCH BROOM SEWING MACHINE COMPANY, OF PITTSBURG, PENNSYLVANIA.

BROOM-SEWING MACHINE.

SPECIFICATION forming part of Letters Patent No. 402,337, dated April 30, 1889.

Application filed October 11, 1887. Serial No. 252,024. (No model.)

*To all whom it may concern:*

Be it known that I, CHARLES E. LIPE, of Syracuse, Onondaga county, and State of New York, have invented new and useful Improvements in Broom-Sewing Machines; and I declare the following to be a full, clear, and exact description of the same, reference being had to the accompanying drawings, where like references indicate like parts in each figure.

The object of this invention is to bring to a greater degree of perfection the results aimed at and described in my former patents, granted April 3, 1877 and June 29, 1880, and numbered, respectively, 189,240 and 229,322. Certain parts or devices retained in the present improvements and not fully described herein may be found described and explained in said former patents.

In the drawings, Figure 1 is the plan; Fig. 2, a sectional elevation on the line X X, Fig. 1; Fig. 3, a front end elevation; Figs. 4 to 27, inclusive, detail views of the various parts.

The relative arrangements of the pressing mechanism, sliding broom-carriage, path of the needle in stitching, and take-up devices remain the same as formerly, and are therefore well known in the art.

Referring to Fig. 1, it will be seen that a large number of parts are in duplicate and arranged symmetrically with respect to the central line of the machine.

To facilitate the following references the odd numbers have been chosen to designate such parts as appear on the left side of the machine and the even numbers those on the right side thereof.

Referring to Figs. 1, 2, and 3, 1 represents the frame of the machine, which by preference is cast in one single piece and provided at the proper points with the required bearings and places of attachment. 2 is the main shaft; 3, the driving-pulley. 4 and 5 are crank-shafts, one on each side of the machine, suitably bevel-geared to the main shaft, as shown in Fig. 1. These crank-shafts, with the connecting-rods 6 and 7, constitute the needle-operating device, detailed farther on. 8 is the broom-carriage, sliding on suitable guides, 9 and 10. 12 and 13 represent the pressing-levers, pivoted at 14 and 15. The levers are not shown in Fig. 1. Said levers are provided at their upper ends with pressing-pads 16 and 17, adapted to slide thereon up and down, thereby enabling the operator to bring pressure to bear on the broom at any desired point. Pads 16 17 have jointed connecting-rods 18 19, with a forked and counterweighted lever, 20, pivoted at 21, Figs. 2 and 3. Said counterweighted lever nearly balances the weight of said pads, so that very little exertion is required to raise or lower the pads, which are moved simultaneously by the forked lever 20. A series of notches, 22 24, &c., Fig. 3, on the lever 12, adapted to engage a spring-pawl, 26, attached to pad 16, provide means of retaining said pads at any desired point.

Pressing-levers 12 13 are geared together with a single tooth, 27, and notch 28, thus constraining the pads 16 17 to move simultaneously to and from the broom. The arrangement for opening and closing said levers is shown in detail in Figs. 3 and 4. An eccentric bush, 33, is fitted to turn in lever 13. Journaled in said bush is a short shaft, 31, to each end of which is attached a link, 29 30. Said links extend to the double-crank shaft 34, journaled in lever 12, each link attached to its corresponding crank, as shown. The link 30 is jointed at 35 to allow of its being swung out horizontally, as shown in broken dotted position, for the purpose of allowing the broom to be moved forward to the sewing mechanism. The outer arm of shaft, 34, is extended, as at 36, where a pivotal connection is formed with a rod, 38, extending downward to a foot-treadle, 40, Figs. 2 and 3. Pressure applied to the treadle 40 causes shaft 34 to partially rotate, thereby closing levers 12 13 upon the broom.

To provide for different thickness of brooms, the links 29 30 are shortened or lengthened with respect to lever 13 by rotating the eccentric bush 33. This is done by means of the rack 35, Fig. 3, which engages with teeth on the periphery of bush 33. Said rack slides in a proper bearing in the lever 13, the projecting end of the rack being threaded to receive the adjusting-nut and hand-wheel 37.

The broom-holding jaws and devices for putting on and retaining the bands preparatory to stitching will now be described.

The jaws proper, 42 43, Figs. 3, 6, 7, and 8, are pivoted to the hollow spindle 41, which is suitably pivoted to the rear end of carriage 8, as in former machines. The lower portions or bowls of said jaws are also constructed as formerly; but the upper bars, 50 51 52 53 54 55, are now pivoted to the lower portion, as shown at 44 45, Figs. 5, 6, 7, and 8, in a manner somewhat similar to hand-presses long in use. These bars in the following description and subsequent claims will be termed "swinging clamps." The number of pairs of these clamps used is determined by the number of bands desired on the broom. The common pivot 44 45 suffices for all that are used, and each clamp is independent in its movement to the following extent: When all are dropped down and away from the broom, as in Fig. 5, the first or shortest pair, 50 51, may be raised to the broom, as in Fig. 6, the others remaining down. If the next pair, 52 53, be now raised, they will retain the first pair in position by means of the small pins 56 57, Figs. 8 and 13, resting against the shouldered recess formed in the first pair, as shown in Fig. 13.

Each clamp has a projecting pin or a contact-surface, which may be at the bottom of a notch, and which bears against the pin of the adjacent clamp. It is obviously immaterial which of the clamps bears the projection and which the notch, so long as there is a notch-and-pin engagement between adjacent clamps, whereby the preceding clamp is locked by the succeeding one, the last clamp so raised always retaining in contact with the broom all the previous clamps. The last pair of clamps in the system being provided with spring-catches 60 61, that catch the opposite clamp when pressed upon the broom, thereby retains the broom until it has been stitched and returned for removal. The upper edge of the jaw proper and each clamp is fitted with a sufficient number of small spurs, 170, to hold the band to allow the free passage of the needle on either side of the band. These spurs are made from sheet metal, spring-tempered, and so formed as to pinch the clamp when in place, and at the same time be free to slide along the same. This yielding motion allows the spurs to move slightly in case the needle should strike them in its passage through the broom. Fig. 11 shows an enlarged view of such a spur.

To swing up each pair of clamps successively the following devices are employed in the present machine, although it is apparent the clamps may be swung by other mechanism or by hand: An arched casting, 62, Figs. 5, 6, 14, and 15, is pivoted at a convenient place in front of the pressing-levers 12 13, a suitable pivot being found in the projecting ends of 14 15, sufficient looseness being introduced to allow said arch to swing slightly to and from said pressing-levers. A pair of sliding bars, 64 65, termed "clamp-lifters," one on each side of the broom, are adapted to move up and down in suitable guides in the arch 62 in an oblique direction, as shown, the upper ends of said lifters approaching each other as they are raised. In order to operate said lifters in unison, a portion of the length is cut with rack-teeth, Fig. 10, adapted to engage with corresponding teeth on the segments 66 67, having a common shaft and journaled at 68 69, attached to the arch 62. An operating-handle, 63, Figs. 9 and 14, is also provided. As the path of the lifter is oblique to the plane of revolution of its operating-segment, the teeth on the segments are cut with a corresponding angle to insure smoothness of action.

In Figs. 14 and 15 is shown the attachment between the arch 62 and pressing-lever 13, said attachment for convenience being made on the left side of the machine. A lug, 71, on the back of the arch forms a guide for a short shaft, 73. One end of this shaft is formed into a projecting link or stirrup, $73^{\times}$, which may pass through the gap cut in the back of said lug 71, said gap allowing a slight rotating movement of said link and shaft independent of its sliding or longitudinal motion, which makes it independent of the movement of the lever to which it is attached, as follows: Through the free end of link $73^{\times}$ a strap, 93, shaped to correspond with a stepped projection, 75, fastened to the pad 17 and working freely therein, serves to keep the end or link 73 in contact with the step 75. The object of this device will become apparent in connection with the following description of pressing the broom and putting on the bands and clamps.

The broom to be sewed is placed in the open jaws, the pads, clamps, and lifters being in their lowered position, as shown in Fig. 5. Pressure being brought to bear on the treadle 40, the pads are pressed against the broom-jaws, squeezing the broom to the proper size. Suitable clasps on the jaws are provided to hold the jaws on the broom after the pressure is released. One end of a piece of twine long enough to form the band and its row of stitches is next passed through the edge of the broom nearest the operator either by means of a hook held in the hand or by a hook attached to the machine, as shown in Fig. 27, and which will be more fully explained farther on. The twine is then passed around the broom by hand, usually twice, and the remaining end passed under the band at the point of starting and drawn up taut. The band now rests on top of the spurs with the end to be afterward used in stitching hanging down in front, as in Fig. 7. When the pressure-pads 16 17 are in this initial position, the arch 62 is just far enough away from the pressing-levers, so that the ends of the clamp-lifters will strike the inner or first pair of clamps, Fig. 14, when operated by the handle 63 and segments 66 67. The upward and inward movements of the lifters raise the clamps and wedge them tightly against the broom, as shown in Fig. 6. The pressure-pads are now released from contact with the jaws and raised to the position shown in Fig. 14, in line with the clamp just raised. This brings the first step on 75 up against the link 73˟ and raises it up against its upper stop on gap 71, as in Fig. 14. The pads are now brought into contact with the clamps 50 51, holding them firmly against the broom when the lifters are dropped back to their normal position. The arch being now free of strain, the tendency on account of the overhanging weight is to swing back away from the broom. The link 73˟ then falls to the position as dotted in Fig. 14, thereby bringing the lifters 64 65 in line with the second pair of clamps, 52 53. Another band is now passed around the broom similar to the first. The clamp-lifters are again operated to raise the second pair of clamps, 52 53, to the broom. The pads 16 17 are now released, as before, and raised another notch to hold the clamps 53 54, while the lifters are again dropped back and the arch swung out, as before, in readiness for another operation of banding and clamping. When the last pair of clamps are in position and pressed to close the clasps thereon, the broom is ready to be swung forward and downward, as in former machines, to be stitched.

The stitching or needle mechanism consists of the needle 74, Figs. 1, 17, 24, and 25, guideways 76 78 on one side of the broom and 77 79 on the opposite side, needle-drivers 80 81, connecting-rods 6 7 and switch-rods 84 85, switch-cams 86 87, secured to the main shaft, short swing-links 88 89, pivoted to the frame, and pivoted connections 90 91 at their upper ends to connect with rods 84 85 and crank-shafts 4 5. The main and crank shafts are suitably journaled to the frame, as shown. They are also geared together, so that one revolution of the main shaft revolves the crank-shafts twice, and the cranks are so placed thereon that both approach and recede from the broom in unison. Take-up arms 94 95 are also secured to the main shaft and operate as described in said former patents. Further description of them is therefore omitted here, and their hook ends are broken away, as shown.

Shaft 2 has a series of cams affixed thereto. These cams (one of which is shown at 87, Fig. 2) operate on the free ends of links 88 89, and through the medium of rods 84 85 are constructed to give a short longitudinal movement to the needle-drivers 80 81 at the proper time to alternately seize and release the needle as it passes to and fro through the broom.

The guideway, as 76 78, is made up of two pieces of steel, as detailed in Figs. 18, 19, 20, 21. The two parts are fitted up with a tongue-and-groove connection, which is placed at one side of the center, as shown. They are also cut away along one entire side, as shown in Fig. 18, thus forming a guide for the inner end of the needle-driver, as shown in Figs. 25 26, and on the other side for about half-way from their inner ends, as shown in the lower part of Fig. 18. A groove to fit the needle is also formed on the inner surface of each part. They are secured in position on a projecting part of the frame, their inner ends facing each other, with sufficient space intervening to allow of the free movement of the broom in stitching.

The needle is shown in detail in Fig. 17 and in section with inserted tension-spring in Fig. 25. It is the same needle as formerly used, except that the mortise through near each end is now made through from side to side instead of from top to bottom. The needle-driver 81 consists simply of a short bolt or pin, which enters the perforation in one end of the needle and constitutes a catch or coupling between the pitman 7 and the needle. The bolt 81, as shown, is cut thin at one end and provided with an opening at the other, as shown in Figs. 25 and 26. The thin end works freely in the mortise in the needle and also fits the space between the two parts of the guideway. The body portion forms a wrist-pin, which fits the inner end of connecting-rod, and the perforation on the other end connects with the stem on the switch-rods.

The passage of the needle is accomplished as follows: Assuming the position as shown in Fig. 24, the shafts rotating in the direction of the arrows, just previous to arriving on the line of centers, as in Figs. 1 and 25, the cam 87 will commence to withdraw the driver 81 and the cam 86 to push in the driver 80, completing the transfer or switching to the opposite side very soon after passing the line of centers. This cam action is made to take up as little time as possible, so as not to allow both drivers to retain connection with the needle after starting outward. To provide for the slight unavoidable variation in distance which must take place and insure safety of transfer, the needle-slots are made somewhat longer than the width of the driver. A half-revolution of the main shaft will now take the needle to the end of its stroke and bring it back to the mid-position, and the cam 86 is of such contour on this half that it serves to compensate for the angular vibrations of the rod 84, and does not act on the driver until it is ready to be withdrawn entirely and pass the needle to the opposite side.

Pivoted at one side of the frame, as at 97, Figs. 2 and 3, is an upright rock-lever, 99, controlled in its movement by a suitable stud and friction-roller connection at 101 with cam 103. Pivoted at the upper end of 99 is a rod, 105, extending over to the broom-rocker 107, where a similar pivoted connection is had in one of a series of holes in said rocker. The function of the broom-rocker 107 and its manner of attachment to the broom-holding jaws and spindle are fully set forth in former patent, No. 229,322, and are therefore well known in the art. The required angular rocking motion of the broom is obtained by connecting rod 105 in rocker 107 at the proper distance from its pivotal center.

Pivot-shaft 97 may be extended through the frame to form the pivotal center of the rock-lever 109, also actuated by a cam, 111, in a manner similar to the one before mentioned. Connection 113 is pivotally attached to said lever 109 at one end and at the other to the rear end of controlling-lever 108, said lever having a downward projecting stud at this point to work freely in the slot 115, Fig. 1. The function of cam 111 and subsequent connections is to give the broom the short longitudinal movement between the stitches, as in former machines.

The feeding devices being essentially different from that hitherto employed will now be described. It is, however, apparent that the chain or flexible cord 126, hereinafter described, may be used with any well-known form of feed mechanism—such, for instance, as the mechanism referred to in my former patents. This chain or cord supports the broom-jaws and broom without preventing a free movement thereof. When the chain is tightened, the jaws will be raised, but will still be free to oscillate within the loop or flexed portion of the chain.

Pivotally attached to the carriage 8 are a pair of levers, 116 117, which I will term "pinch-bars." Their forward ends extend upward, as shown in Figs. 2, 22, and 23, terminating in curved faces, as shown by the dotted lines, and projecting pivots, on which are mounted the small chain-sheaves 118 119. The curved faces of the pinch-bars 116 117 form the guides to the broom-jaws in stitching, and serve as an abutment to resist the thrust of the needle in its passage through the broom. From the rear ends of the pinch-bars 116 117 are downward-projecting arms, terminating in studs 120 121 at right angles thereto. At a point on the carriage midway between said studs is located a stud, 122, the upper portion of which is screw-threaded. The lower portion is made smaller in diameter and shouldered at the end of the threaded part, as shown. Surrounding this stud is a sliding triangular piece or wedge, 124. The lower end of 124 slides freely on the lower part of the stud. The upper end of cross-bar is threaded similarly to the stud, as a nut would be, but sufficiently large in diameter, so that when held central with the stud, as in Fig. 22, it will slip through without contact. The angular faces of 124 rest on the studs 120 121, while rotation is prevented by the arms to which said studs are attached. A coil-spring, 125, surrounds the lower part of stud 122, the shoulder on said stud forming one abutment and the piece 124 the other. It will be seen that the tendency of the spring is to depress the wedge 124, which, resting on the studs 120 121, operates on the pinch-bars to close their abutting faces. Conversely, if the pinch-bars are both opened equally, it will cause the wedge to be raised and the spring compressed. This arrangement automatically adjusts the pinch-bars to any thickness of broom and maintains it in a central position; but if pressure is applied against one bar only, as in the direction of the arrow, Fig. 23, the unbalanced force against the wedge will cause it to tip over, as shown, thus causing the screw-threads to lock on the other side and prevent any further opening of the bars 116 117. When the direction of the thrust of the needle is reversed, a slight lateral movement of the broom will reverse the locking of the wedge to the opposite side and then resist any further displacement from a central position. This device automatically adjusts itself to any thickness of broom, resists lateral displacement from either side, and steadies the broom in its movements past the stitching mechanism.

The feed mechanism proper consists of a chain or flexible cord, 126, secured at one end to the carriage at 128, thence passing up over the sheaves 118 119, and down on the opposite side. It is attached to the rack-bar 127, Figs. 2 and 23. Said rack is free to slide up and down in a suitable guide in one end of the bell-crank lever 129, the tendency of said lever being to hold the rack into gear with the pinion 131, which is attached to the ratchet-wheel 133 and revolves with it. A pair of feed-pawls, 135 137, Fig. 2, one adapted to push and the other to pull, and having a common pivoted connection with the power end of lever 99, act on the ratchet 133, being held in contact thereto by the spring 139.

Means of disconnecting the rack 127 and pinion is provided for by a bent rod, 141. The vertical leg is pivoted to the bell-crank 129 and is suitably guided near its upper end, the bent portion extending out at right angles just over the lever 108, the raising of which causes the rod 141 to lift the bell-crank lever 129, and consequently draw the rack out of contact with the pinion 131.

On the edges and sides of the broom-jaws is formed a groove, 145, Figs. 7 and 23, rounded at the root and adapted to rest on the chain. As the broom is thrown forward to be stitched and dropped down to its lowest position, a loop is formed in the chain, which takes up the slack and raises the rack 127 to its highest position. An adjustable stop, 147, strikes the carriage at the proper point to bring the first stitch at the required distance from the edge of the broom.

The mechanism for starting and stopping the machine consists, essentially, of any approved form of friction-clutch contained in the drum, which may also be a part of the cam 111, and adapted to be moved into contact with the pulley 3 by means of a rod extending through the shaft 2, which is made hollow for that purpose and connected with the forked arm 140, secured to the shaft 142, to which is attached at a convenient point to the operator the shipper-handle 144. The broom being placed in the machine and properly pressed and banded, as hereinbefore described, the operator steps around to the right side of the machine and, swinging out the link 30, swings the broom down. At the same time he lifts the lever 108 to locate the upper band in line with the needle. This releases the rack 127 and allows the broom to drop to its depressed normal position. The lever 108 is then dropped into a notch in the plate 146. By means of mechanism fully described in Patent No. 299,322 the eye of the needle is now opened, and the end of the twine on the proper band is inserted, and the slack all drawn through, when the machine is started by means of the lever 144. The needle having passed out of the broom on the opposite side, the cam 103 now commences its action and rocks the broom. At the same time the feed-pawls are moved in the direction of the arrow, which causes the hook-pawl to move the ratchet one tooth and elevate the broom, so that the needle may enter at the same point it came out, but on the opposite side of the band. The cam 111 having acted simultaneously with the cam 103 and moved the carriage longitudinally sufficiently far to carry the band past the point of the needle, the take-up hook having also pulled the free end of the twine through after the needle, the needle is returned to its place of starting, the broom is rocked as before, which moves the rock-lever 99 in the opposite direction, and the pawl 135 now acts on the ratchet to raise the broom, as before. Thus the stitching progresses until the band is traversed. The machine is thrown out of gear when the needle is on the side toward the operator. As the lever is raised and the feed-rack disengaged, the broom falls by its own weight. The lever 108 is now placed in another notch, another end of twine pulled through the needle, and the machine is ready to proceed again. When the successive bands have all been stitched, the broom is returned to its vertical position between the pressing-levers, the gate-link 30 is closed, and the broom is released by unclamping the retaining-clasps and taken out.

Fig. 27 represents a partially-automatic arrangement for operating the hook to pull the end of the banding-twine through the broom. It is not essential to the working of the machine, but when attached as shown greatly facilitates the banding of the broom in saving time and locating the fastening of the band at the same place on all the brooms. Attached to the frame at a convenient point is the standard 161, the upper end of which is fitted to receive a swivel-shaft, 159. Pivoted to 159, at right angles thereto, is the bent end of a rod, 155, which extends forward toward the operator, terminating in a convenient handle. A link, 153, is loosely attached at its upper end to the rod 155 and at the lower end to an arm, 151, rigidly attached to the lever 20, Figs. 2 and 27.

The hook 157 is clamped on the rod 155 at any desired distance from the edge of the broom. The hook is adjusted for height so as to just pass over the top of the pad 17, and being attached to the same lever, 20, that raises said pad it is always in position to operate. Its movement away from the broom is regulated by any convenient stop or by the amount of looseness in the connections. The pivoted point 159 is somewhat higher than the bands on the broom, so that the point of the hook will follow appropriately the flaring edge of the broom as it proceeds from the lower band upward.

It is apparent that the mechanical equivalents may be substituted in many parts of my machine without departing from the spirit of my invention. I desire to be understood as claiming such equivalents.

I claim—

1. The combination, with a broom-holding vise, of a pivoted clamp provided with a bearing projection, and a second pivoted clamp having a corresponding projection, as described, in position to engage the first when the clamps are closed, substantially as described.

2. In a broom-sewing machine, a pair of pressing-levers actuated by usual compressing mechanism, a sliding pressing-pad attached to each lever, and a catch by which the pad can be held in adjusted position relatively to its lever, all in combination, substantially as set forth.

3. In a broom-sewing machine, the combination of the pressing-levers and their actuating mechanism, a sliding pressing-pad on each lever, a connecting-rod attached to each pad, and a counter-weight connected to both rods to counterbalance the weight of the pads, substantially as described.

4. In a broom-machine, a pair of pressing-levers suitably pivoted to the frame, an eccentric bushing on one lever, an adjusting screw and rack operating on the eccentric to hold the same in adjusted position, and a link connecting the bushing to the other lever and the lever-actuating devices, all combined substantially as described.

5. In a broom-machine, a broom-holding vise provided with a series of swinging clamps, bearing projections from said clamps, as described, and a catch for holding the clamp last operated, all combined substantially as described.

6. The combination, with a broom-holding vise, of a series of swinging clamps secured thereto, projecting bearing-surfaces on the clamps, and movable clamp-lifters in proximity to said clamps, substantially as described.

7. In a broom-machine, the combination, with the sewing-needle and the holding-clamps, of a series of yielding band-supporting spurs borne by said clamps, substantially as described.

8. In a broom-machine, the combination of the clamping-pads, a banding-hook, a hook-supporting rod, and connections from said rod to the pad-operating mechanism, whereby the banding-hook is made to maintain the proper relation with the pads, substantially as described.

9. In a broom-machine, the combination of the broom-holding jaws, a pair of movable pinch-bars in proximity thereto, and adjunctive mechanism bearing on the pinch-bars, substantially as described.

10. In a broom-sewing machine, the combination of the broom-jaws, a pair of pivoted pinch-bars in proximity to said jaws, a wedge with which said pinch-bars have engagement, and a locking-stop by which the wedge may be operated to hold the pinch-bars, substantially as described.

11. In a broom-sewing machine, the combination of the broom-jaws, a pair of offset pinch-bars pivoted in the frame and having bearing-surfaces, as described, a wedge between the pinch-bars and having bearing on both said bars, and a screw-threaded spindle in position to engage and retain said wedge, substantially as described.

12. In a broom-sewing machine, a double-pointed needle and a guideway therefor, a crank, and a pitman and pin connecting the crank directly to the needle, all in combination, substantially as described.

13. In a broom-sewing machine, a needle having engaging means at each end thereof, a guideway for said needle, a crank at each end of the needle, and a pitman connected to each crank and having means for alternate engagement with the needle, in combination, substantially as described.

14. In a broom-sewing machine, a needle having engaging means at each end thereof, a guideway for said needle, a crank at each end of the needle, a pitman connected to each crank and having means for engaging the needle, and a switch engaging the pitman alternately with the needle, all in combination, substantially as described.

15. In a broom-sewing machine, a double-ended needle having engaging means at each end thereof, separate needle-drivers at each end of the needle, also provided with engaging means, and separate cams, whereby the needle-drivers are alternately coupled to the needle, all in combination, substantially as described.

16. In a broom-machine, the combination of the frame, swinging broom-jaws supported by the frame, and a flexible chain-support connected to the frame in position to support the jaws when swung down, all substantially as described.

17. In a broom-sewing machine, the combination, with the broom-jaws, of a flexible chain-support for said jaws and a chain-tightener, whereby the flexure of the chain may be regulated, substantially as described.

18. In a broom-machine, the combination of the swinging jaws, a flexible chain-support therefor, a rack attached to said chain, and a pinion and driving-ratchet by which the chain may be tightened, substantially as described.

19. In a broom-machine, the combination of the swinging jaws, a chain-support therefor attached at one end to the frame, a rack attached to the other end of the chain, an actuating-pinion for said rack, and a lever by which the rack and pinion may be thrown into or out of engagement, substantially as described.

CHARLES E. LIPE.

Witnesses:
W. H. THOMAS,
JOHN E. SWEET.